United States Patent
Bolocan et al.

(10) Patent No.: US 12,475,225 B2
(45) Date of Patent: Nov. 18, 2025

(54) AGGRESSIVE EMBEDDING DROPOUT IN EMBEDDING-BASED MALWARE DETECTION

(71) Applicant: CrowdStrike, Inc., Sunnyvale, CA (US)

(72) Inventors: Diana Bolocan, Galati (RO); Mihaela-Petruta Gaman, Bucharest (RO); Marian Radu, Bucharest (RO)

(73) Assignee: CrowdStrike, Inc., Sunnyvale, CA (US)

( * ) Notice: Subject to any disclaimer, the term of this patent is extended or adjusted under 35 U.S.C. 154(b) by 295 days.

(21) Appl. No.: 18/160,467

(22) Filed: Jan. 27, 2023

(65) Prior Publication Data

US 2024/0256666 A1    Aug. 1, 2024

(51) Int. Cl.
  *G06F 21/00*    (2013.01)
  *G06F 21/56*    (2013.01)

(52) U.S. Cl.
  CPC ...... *G06F 21/566* (2013.01); *G06F 2221/033* (2013.01)

(58) Field of Classification Search
  CPC .......... G06F 21/566; G06F 21/562; G06F 2221/033; G06F 40/30; G06F 16/3344; G06F 2221/034; G06F 40/20; G06F 16/35; G06F 30/27; G06F 16/906; G06F 18/285; G06F 18/23213; G06F 18/213; G06F 16/5846; G06F 16/65; G06F 2207/4824; G06F 2218/08

See application file for complete search history.

(56) References Cited

U.S. PATENT DOCUMENTS

| 9,843,596 B1 | 12/2017 | Averbuch et al. |
| 2019/0007434 A1 | 1/2019 | McLane et al. |
| 2019/0272375 A1* | 9/2019 | Chen ............... G06N 5/045 |

(Continued)

FOREIGN PATENT DOCUMENTS

| CN | 110362995 A | * 10/2019 | .......... G06F 21/562 |
| CN | 111382439 A | * 7/2020 | |

OTHER PUBLICATIONS

Kolter, J. Zico & Maloof, Marcus A., "Learning to Detect and Classify Malicious Executables in the Wild," Journal of Machine Learning Research, Dec. 2006, 24 pages.

(Continued)

*Primary Examiner* — Tri M Tran
(74) *Attorney, Agent, or Firm* — Law Office of Scott P. Zimmerman, PLLC

(57) ABSTRACT

Malware is detected using an embedding-based machine learning model. The model generates embeddings using byte n-grams. A feature importance operation reveals that only a subset of the embeddings is required to detect malware. In some cases, even a single embedding is adequate and retains 99% detection capabilities. An aggressive embedding dropout operation is implemented that ignores lesser-important embeddings. Because perhaps only one, or a few, embeddings need be determined, malware detection is greatly simplified. Malware detection is greatly simplified and need not calculate full-sized embeddings. A malware detection service runs quicker, and just as capably, while consuming less resources.

16 Claims, 17 Drawing Sheets

(56) References Cited

U.S. PATENT DOCUMENTS

2020/0005082 A1 1/2020 Cazan et al.
2022/0366040 A1* 11/2022 Marbouti ............... G06N 3/045

OTHER PUBLICATIONS

Malhi, Arnaz, "PCA-Based Feature Selection Scheme for Machine Defect Classification," IEEE Transactions on Instrumentation and Measurement, vol. 53, No. 6, Dec. 2004, 9 pages.

Zhang, Xiang, Drouin, Alexandre, & Li, Raymond, "byteSteady: Fast Classification Using Byte-Level n-Gram Embeddings," arXiv:2106.13302 [cs.CL], Jun. 24, 2021, 7 pages.

Zhu et al., "Self-representation and PCS embedding for unsupervised feature selection," Topical Collection: Special Issue on Deep Mining Big Social Data, Jul. 27, 2017, 14 pages.

Raff et al., "An Investigation of Byte N-Gram Features for Malware Classification," Journal of Computer Virology and Hacking Techniques, Mar. 30, 2016, 20 pages.

* cited by examiner

FIG. 5

| PC | 0 | 1 | 2 | 3 | 4 | 5 | 6 | 7 | 8 | 9 | 10 |
|---|---|---|---|---|---|---|---|---|---|---|---|
| Embedding Index | 40 | 45 | 32 | 1 | 17 | 43 | 52 | 61 | 31 | 44 | 12 |
| Magnitude | 0.9812 | 0.9086 | 0.8653 | 0.94299 | 0.6778 | 0.6670 | 0.9572 | 0.8773 | 0.7497 | 0.7218 | 0.6262 |

FIG. 7

|   | Best Embedding | Best 4 Embeddings | Best 10 Embeddings | Reference |
|---|---|---|---|---|
| AUC | 0.99905 | 0.99921 | 0.99927 | 0.99968 |
| PartialAUC | 0.98338 | 0.98485 | 0.98558 | 0.98804 |
| Logloss | 0.02415 | 0.02188 | 0.02152 | 0.01628 |

FIG. 9

| prog | fx_office | fx_office_dropout | % Change |
|---|---|---|---|
| | Total Time | | |
| mean | 248 | 188 | |
| 50% | 150 | 111 | |
| 75% | 317 | 225 | |
| 95% | 646 | 464 | |
| 99% | 1162 | 930 | -20% |

FIG. 10

| | Min | Max | Mean |
|---|---|---|---|
| Embedding Vector Slicing/Dropout | 39 | 774 | 106.087 |
| Remodeled Embedding Model | 23 | 302 | 33.263 |

82 & 84: Embedding Vector Slicing/Dropout
130: Remodeled Embedding Model

AGGRESSIVE EMBEDDING DROPOUT IN EMBEDDING-BASED MALWARE DETECTION

BACKGROUND

The subject matter described herein generally relates to computers and to computer security and, more particularly, the subject matter relates to predictive cyber-security malware detection using artificial neural networks and byte n-gram embeddings.

Malware detection is resource intensive. Because computer viruses, worms, Trojan horses, and other malicious software (or malware) are constantly evolving, today's malware detection schemes are very complex. Indeed, as malware becomes ever more sophisticated and obfuscating, cyber defenses are equally sophisticated and complex. Malware detection schemes thus often consume much processor, memory, networking, and electrical power resources. Because malware detection is hardware and software intensive, malware detection is especially challenging for Internet of Things (or IoT) devices. These IoT devices have lower-power, lower-performing processor and memory capabilities that may be unsuited for the aforementioned sophisticated malware detection schemes. Techniques are thus needed that quickly detect evidence of malware using reduced hardware and energy resources.

SUMMARY

A malware detection service infers, in real time or in near real time, evidence of malware infecting devices and cloud services. If the malware is undetected, the malware can disrupt computers and smartphones, gain unauthorized access, and even steal money from accounts. The malware detection service thus inspects a computer file for evidence of malware. The malware detection service, in particular, applies a sophisticated and complex embedder to bytes of data (i.e., computer file, execution buffer, etc.). The embedder is a type of artificial neural network. Should the data be suspicious, then the malware detection service may generate alerts that warn of the malware.

The malware detection service implements elegant simplifications. When the artificial neural network receives the bytes of data as input, the embedder generates many embeddings. These embeddings accurately reveal the malware in the bytes when used in an embedding-based classifier. This accuracy is possible by sampling and then embedding multiple byte sequences provided in the input data. These embeddings, though, are very complex and require much processor, memory, and battery resources, especially when discussing IoT devices. In some examples, though, a feature importance operation reveals that fewer of these embeddings may be used to accurately predict the malware within the bytes of data. Indeed, in some cases, a single embedding is adequate to predict malware. The artificial neural network thus implements what the inventors term an aggressive embedding dropout operation that ignores lesser-important embeddings. Because a small part or set of the embeddings needs to be determined, the malware detection service is greatly simplified. The embedder need not waste time calculating lesser-important embeddings. A computer thus quickly detects the malware, and just as accurately, while consuming less processor, memory, and battery resources.

The aforementioned simplifications are especially helpful to IoT devices. WI-FI® cameras, door locks, thermostats, and other smart devices are especially vulnerable to malicious cyber attackers. IoT devices often have a relatively slow processor, a small memory device, and a small battery. Because IoT devices have limited hardware resources, IoT devices are often unsuited for sophisticated malware detection schemes. The inventors' elegant simplification, then, greatly improves malware detection for less-capable devices. Because the embedder implements the aggressive embedding dropout operation, the malware detection service may be installed to and executed by IoT devices without overly consuming limited hardware resources. Smart watches and wearables, smart speakers, wireless tags, smart lights, smart sensors, and other IoT devices may now implement a sophisticated, machine learning based malware detection service.

BRIEF DESCRIPTION OF THE SEVERAL VIEWS OF THE DRAWINGS

The features, aspects, and advantages of malware detection powered by machine learning are understood when the following Detailed Description is read with reference to the accompanying drawings, wherein:

FIGS. 4-10 illustrate prototype examples of machine learning powered malware detection;

DETAILED DESCRIPTION

Figure 1:
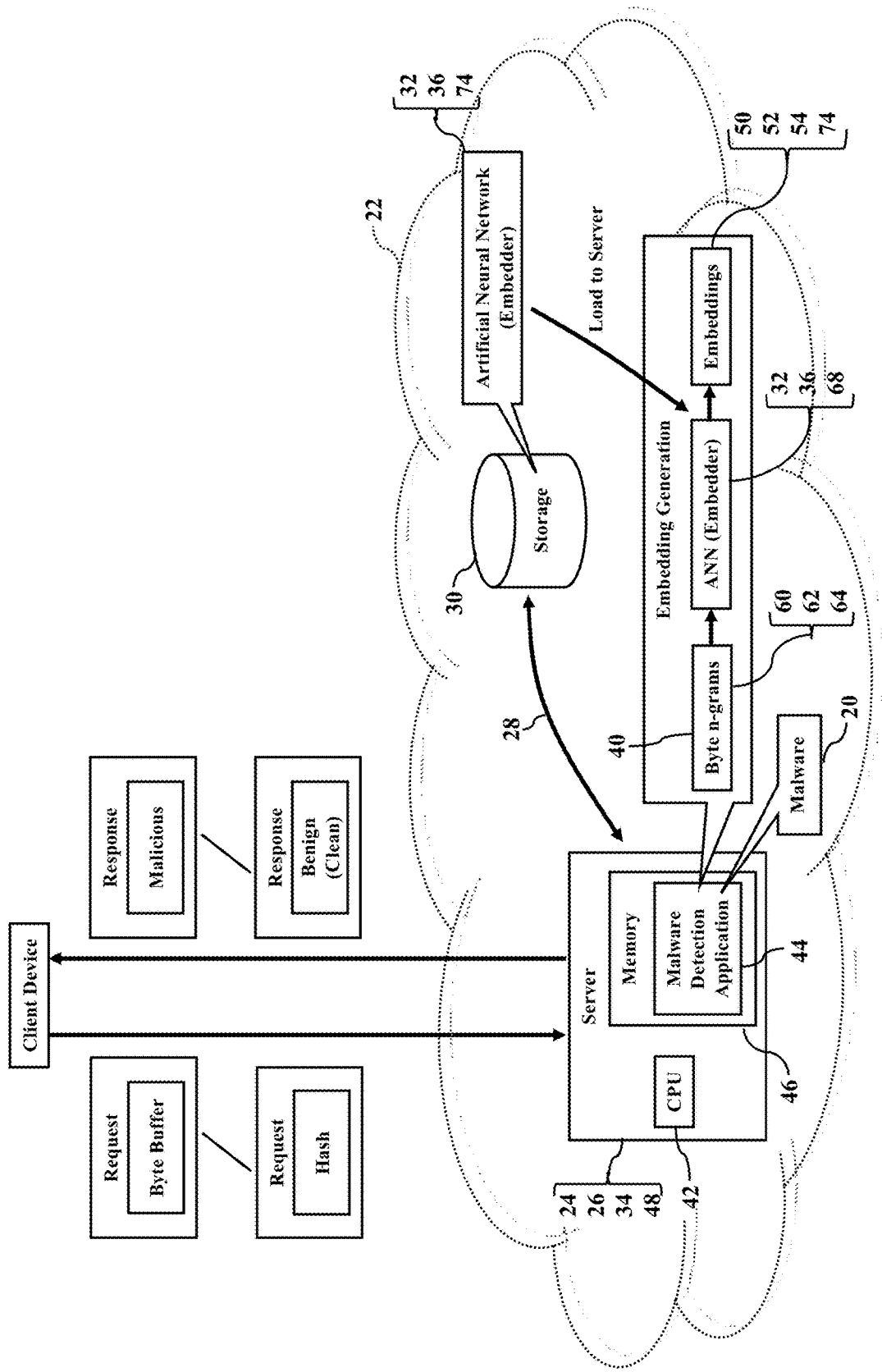
FIGS. 1-3 illustrate some examples of inferring malware in a cloud-computing environment.

Some examples relate to malware detection using machine learning. Cybercrime is growing, and nearly every day we read of another hack. Malicious software (often called malware) exploits vulnerabilities in websites, emails, text messages, and other computer files. The malware is commonly hidden deep within the bytes that represent computer program code. Examples of a malware detection service thus inspect the bytes for evidence of computer malware. The malware detection service detects the malware using a machine learning model. The machine learning model uses many embeddings generated by a neural network embedder. Each embedding may be represented as a vector or as a list or array of values. While the embeddings may have many values, the examples are described using sixty-four (64) values. Each embedding, in other words, may be represented as a vector having sixty-four (64) values. Depending on the embedding generation technique used, the embedding might become difficult to generate and analyze especially in the cases where hardware resources are limited.

Example techniques, however, implement elegant simplifications. The malware detection service, for example, implements a feature importance operation. The feature importance operation determines which of the embeddings is/are more important for, or more descriptive of, detecting malware. The feature importance operation, in particular, orders the position indices of the embeddings from high to low according to their importance/descriptiveness. Once the feature importance operation identifies highly important embedding(s), the malware detection service may rely only on the values from these positions. The malware detection service may then implement an aggressive embedding dropout operation. Once the feature importance operation identifies the important or descriptive embeddings, the aggressive embedding dropout operation causes the malware detection service to ignore or exclude lesser or unimportant embeddings. These lesser or unimportant embeddings are less descriptive of, and have little predictive effect, on the presence of malware within the provided bytes. The malware detection service, by ignoring lesser-predictive embeddings, executes faster using less computing resources.

Examples of the malware detection service greatly reduce consumption of memory and CPU cycles. Experimental testing was conducted using the feature importance operation and the aggressive embedding dropout operation. Different machine learning models were applied to a corpus of millions of MICROSOFT® Office documents. Baseline test results were generated by training a machine learning model to detect malware in the MICROSOFT® Office documents using all the sixty-four (64) embedding values. Experimental machine learning models were then trained using only embeddings from positions which returned high information retention. The feature importance operation, in other words, was applied to rank the sixty-four (64) positional values of the embedding vector, based on their respective information/descriptiveness. The experimental machine learning models applied the aggressive embedding dropout operation and, respectively, kept only the top 1, 4, and 10 embeddings. The experimental machine learning models were thus trained using the aggressive embedding dropout operation by ignoring or excluding most, or nearly all, lower-ranked embedding values. Even though most of the embeddings were ignored, each experimental machine learning model still retained at least 99% accuracy as compared to the baseline test results that used all the sixty-four (64) embedding values. Indeed, the experimental machine learning model, trained using only the single, first-ranked embedding, still retained over 99% accuracy. Moreover, the experimental results showed that training the machine learning model using two (2) or more embeddings (e.g., 2-10 rankings) was not justified in certain cases, as no significant improvement in capabilities was obtained. Performance benchmarking (measured as tracing function call execution times) also showed a large 20%-30% reduction in runtime using the feature importance operation and the aggressive embedding dropout operation, as compared to the baseline test results.

The simplification is especially helpful to IoT devices. WI-FI® cameras, door locks, thermostats, and other smart devices are especially vulnerable to malicious cyber attacks. IoT devices often have a relatively slow processor, a small memory device, and a small battery. Because IoT devices have limited hardware resources, IoT devices are often unsuited for sophisticated malware detection schemes. The inventors' elegant simplification, then, greatly improves malware detection for less-capable devices. Because the malware detection service employs the feature importance operation and the aggressive embedding dropout operation, the malware detection service may be installed to, and executed by, IoT devices without overly consuming limited hardware resources. Smart watches and wearables, smart speakers, wireless tags, smart lights, smart sensors, and other IoT devices may now implement a machine learning based malware detection service, previously deemed as too sophisticated for this type of deployment context.

Machine learning-based malware detection will now be described more fully hereinafter with reference to the accompanying drawings. Machine learning-based malware detection, however, may be embodied in many different forms and should not be construed as limited to the examples set forth herein. These examples are provided so that this disclosure will be thorough and complete and fully convey machine learning-based malware detection to those of ordinary skill in the art. Moreover, all the examples of machine learning-based malware detection are intended to encompass both structural and functional equivalents thereof. Additionally, it is intended that such equivalents include both currently known equivalents as well as equivalents developed in the future (i.e., any elements developed that perform the same function, regardless of structure).

Figure 2:
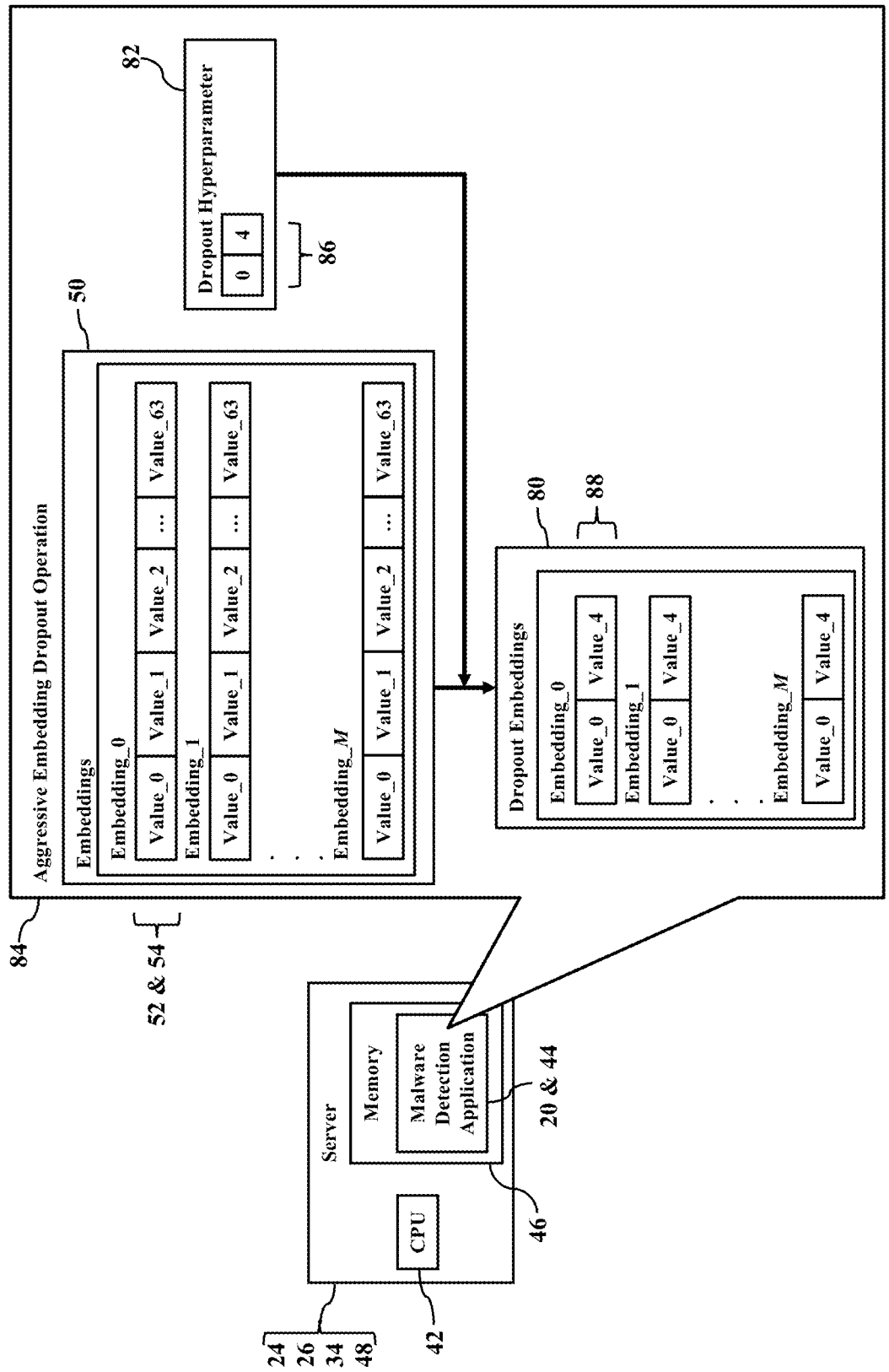
Figure 3:
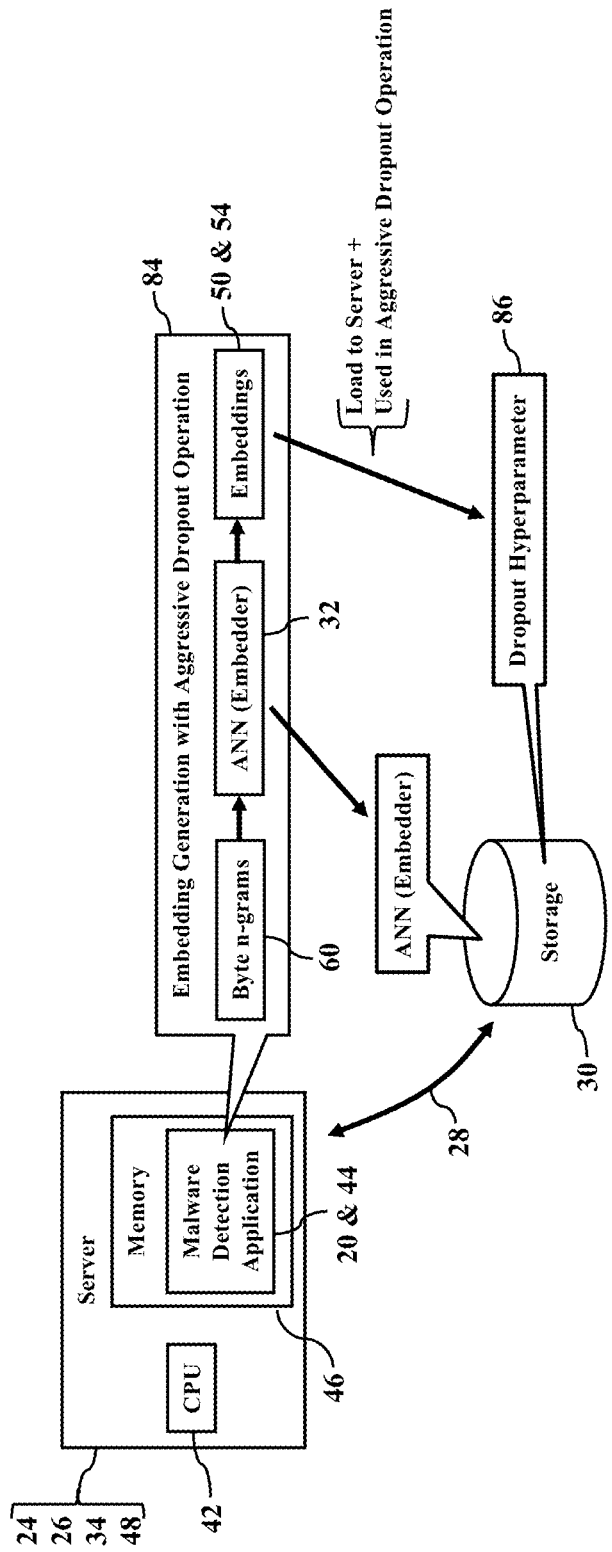
Figure 4:
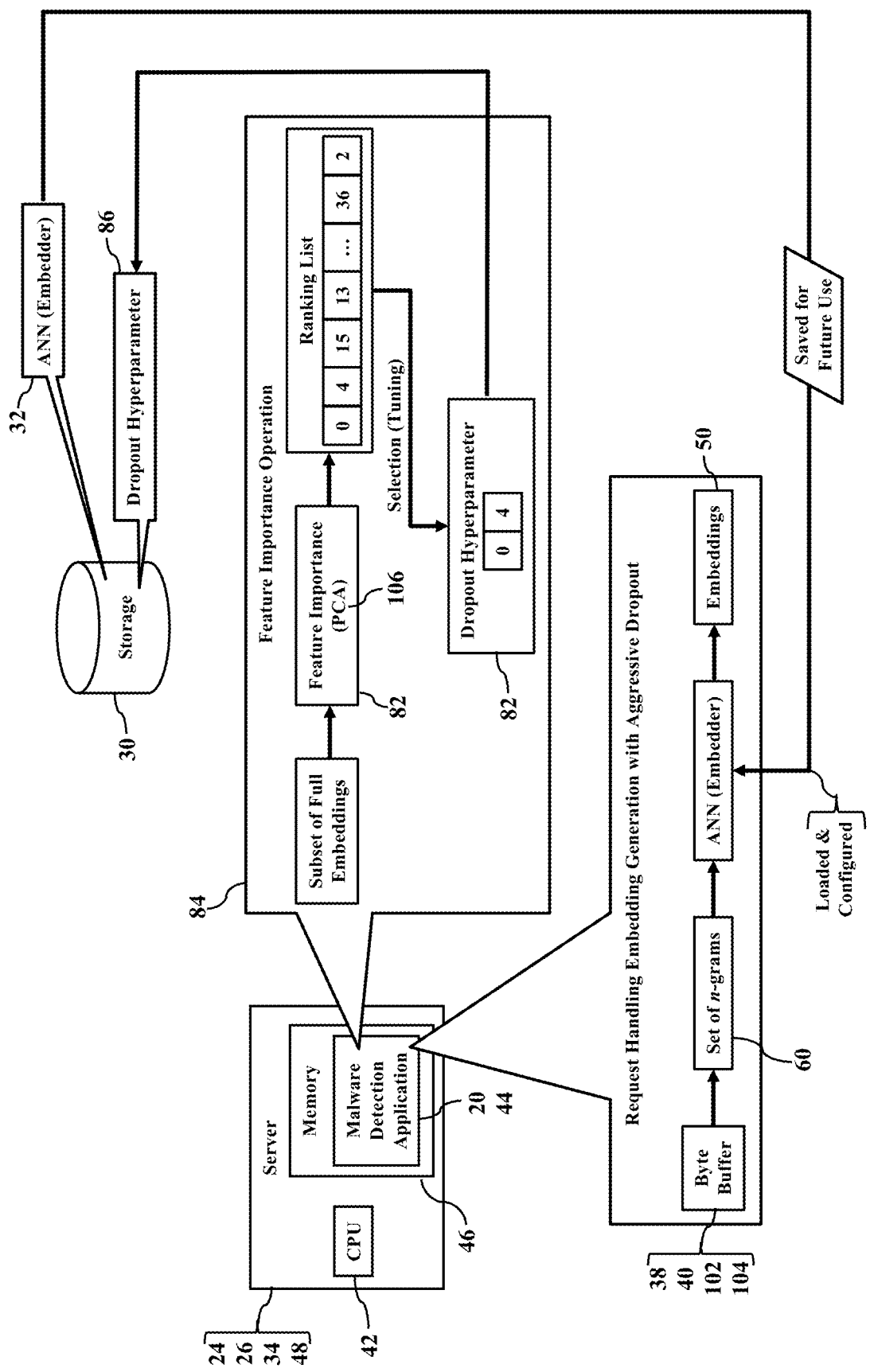

FIGS. 1-3 illustrate some examples of inferring malware 20 in a cloud-computing environment 22. A computer 24 operates in the cloud-computing environment 22. FIG. 1 illustrates the computer 24 as a server 26. The computer 24, though, may be other processor-controlled devices, as later paragraphs will explain. In this example, the server 26 communicates via a network interface to a communications network 28 (e.g., public Internet, private network, and/or hybrid network). The server 26 may thus communicate with other servers, devices, computers, or other network members 30 operating within, or affiliated with, the cloud-computing environment 22. The server 26, for example, interfaces with an artificial neural network 32. The artificial neural network 32 may be one or many of the network members 30 operating within, or affiliated with, the cloud-computing environment 22. The server 26, in particular, interfaces with the cloud-computing environment 22 and/or the artificial neural network 32 to provide a malware detection service 34. The malware detection service 34 is one of perhaps many cloud services provided by the cloud-computing environment 22. That is, the artificial neural network 32 is taught, using deep learning 36, to infer evidence of the malware 20 in a targeted byte buffer (i.e., a memory device 46 storing targeted data of interest, such as a computer file 38 and/or data 40). The server 26 is thus programmed to provide at least a portion, sub-service, or component of the malware detection service 34. The server 26 has a hardware processor 42 (illustrated as "CPU" for central processing unit or microprocessor) that executes a malware detection application 44 stored in the memory device 46. The malware detection application 44 may be a computer program, instruction(s), or code that instructs or causes the server 26 to provide at least a portion of the malware detection service 34, perhaps on demand, on behalf of a service provider 48. Various implementations of the cloud-computing environment 22 are possible and could be used in the examples herein described.

The server 26 loads the artificial neural network 32. The artificial neural network 32 (an "embedder") generates the embeddings 50 as outputs. Techniques for generating the embeddings 50 are known, so this disclosure only briefly explains the embeddings 50. While the embeddings 50 may have many different representations, each embedding 50 is commonly represented as embedding values 52 associated with an embedding vector 54. The artificial neural network 32 receives multiple n consecutive bytes (or byte n-grams 60) which are sampled from the buffering memory device 46. The artificial neural network 32 generates the embeddings 50 from the byte n-grams 60 as inputs, with n being an integer value. These n consecutive bytes 60 are represented as nibbles 62 (the embedder's features 64), thus making the input size equal to two times n (2*n). These nibble-formatted bytes 60 are passed as inputs to the artificial neural network 32. The artificial neural network 32 generates the embeddings 50 (such as the values 52 of the vector 54) as outputs. Additionally, the whole process is done without executing the data ensuring the safety of the computing environment.

The malware detection application 44 inspects bytes for malware 20. A feature extractor 68 randomly extracts a predefined number of the byte n-grams 60. While the byte n-gram embedding model 58 may use other byte sizing, the examples implement byte 4-grams 60 which are formatted as nibbles 62. Each nibble 62 can be defined as four consecutive binary (0/1) digits or the half of an 8-bit byte. A byte is thus composed of two (2) nibbles. The feature extractor 68 randomly extracts the byte 4-gram 60 and its corresponding eight (8) nibbles 62 as features 64. Even though the artificial neural network 32 may have another number of embedding layers, the exemplary implementation has six (6) embedding layers, including an input layer and an output layer of size 64. The artificial neural network 32 thus outputs the embedding vector 54 having sixty-four (64) values. Each embedding 50 may thus describe the byte 4-gram 60 as a vector 54 having sixty-four (64) values. The embedding 50 represents the 64-valued encoding of the corresponding byte 4-gram 60. Because the byte n-gram embedding model 58 and the embeddings 50 are known, additional details are found in U.S. Patent Application Publication 2019/0007434 to McLane, et al. and in U.S. Patent Application Publication 2020/0005082 to Cazan, et al, with each patent application incorporated herein by reference in its entirety.

Each embedding 50 may provide evidence of malware 20. The embedding 50 represents the 64-valued encoding of the corresponding byte 4-gram 60. Analyses of large sets of training data (e.g., billions of the computer files 38) have repeatedly shown that some byte 4-grams 60 occur much more frequently than others. So, if the computer file 38 contains all commonly-occurring byte 4-grams 60, then the computer file 38 may be considered acceptable and machine-classified as clean, normal, or not malicious. However, if the computer file 38 contains one or more relatively rare, less-likely occurring byte 4-grams 60, then the computer file 38 may be considered suspicious and machine-classified as malware 20.

A classification scheme may be used. Once the embeddings 50 are generated, the malware detection application 44 may classify the byte buffer as clean or as malicious. Additionally, the malware detection application 44 may classify using cryptographic hashing. The malware detection application 44 may store predictions (i.e., clean, malicious) over a given data (byte buffer) by hashing either the feature vector (noted FV) or the data. Storing hashes and their predictions can be done locally on the server 26 using a temporary memory, known as cache, or remotely in storages such as library or database 78 of hash values. This enables the malware detection system 32 to map previously calculated responses to the current hash value that it's seeing. The malware detection system 32 no longer needs to send the embedding-based feature vectors (noted FVs) to a classifier 74 in order to compute the prediction, thus returning an instant response. With this response the malware detection system 32 can afterwards do the necessary steps such as isolating/quarantining the data, alerting the customer, sending the data to review or analysis.

As one may now realize, the byte n-gram malware detection service 34 is complex and resource intensive. Each embedding 50 has many components (such as the sixty-four (64) values, as above explained). The malware detection service 34 requires many randomly sampled byte n-grams 60 which each have to get their embedding vector 54. Additionally, integrating them in an embedding-based feature vector (noted FV) adds further complexity to the whole malware detection service 34. In plain words, much processor, memory, and network resources are required, which consume much electrical power. The malware detection service 34 based on byte n-grams thus requires time and much hardware/network resources to detect the malware 20.

FIG. 2 illustrates improved computer functioning for malware detection. The inventors have discovered that the malware detection service 34 may be greatly simplified without sacrificing accuracy when detecting the malware 20. After the malware detection application 44 computes the embedding(s) 50, the malware detection application 44 stores the embeddings 50. For simplicity, FIG. 2 illustrates the embeddings 50 locally stored within the local memory device 46. The embeddings 50, though, may be remotely stored to, and accessed from, a networked location available to the server 26. The malware detection application 44 then reduces and simplifies the embedding 50. That is, the malware detection application 44 instructs the server 26 to generate a slashed embedding 80 by performing an aggressive embedding dropout operation 84, based on the results of a previously run feature importance operation 82. The malware detection application 44 receives the embedding(s) 50 which were generated by the artificial neural network 32 (illustrated in FIG. 1). The malware detection application 44 analyzes the embedding(s) 50 using the feature importance operation 82. The feature importance operation 82 returns a ranking list in which embedding indices (positions) are ordered from most descriptive to least descriptive. Based on this list, a hyperparameter 86 will be constructed which saves a set of the embedding indices. This set represents the smallest possible set of indices which can train a model with high detection capabilities.

The hyperparameter 86 results from a tuning operation. Hyperparameters 86 are determined as a result of a fine tuning operation, where multiple values are used in a controlled environment in order to achieve the best detection outcome. Thus, hyperparameters 86 are adjustable parameters that are tuned in order to obtain a model with optimal performance. For simplicity, the presented hyperparameter 86 will be referred to as dropout hyperparameter 86. The dropout hyperparameter 86 represents a list of one or more values between 0 and 63 which are the positions of the embeddings 50 that are expected to be the most descriptive (important) in differentiating malicious from benign content.

The malware detection application 44 executes the aggressive embedding dropout operation 84. Once the dropout hyperparameter 86 is determined, the malware detection application 44 excludes the remaining values within the embedding 50 that were not identified as the dropout hyperparameter 86. Simply put, the aggressive embedding dropout operation 84 causes the malware detection application 44 to dimensionally reduce the embedding 50 by ignoring values outside hyperparameter 86.

FIG. 2 illustrates the dramatic improvements provided by the feature importance operation 82 and the aggressive embedding dropout operation 84. Recall that the artificial neural network 32 (illustrated in FIG. 1) may output the embedding 50 as the vector 54 having the sixty-four (64) values. The feature importance operation 82 ranks the embedding indices using a provided set of embeddings. The malware detection application 44 then experiments with different sets of embedding indices in order to get the best dropout hyperparameter 86. Once the hyperparameter 86 is identified, the server 26 generates the slashed embeddings 80 by executing the aggressive embedding dropout operation 84. The malware detection application 44 reduces the size of the vector 54 by keeping only the values 52 specified as the dropout hyperparameter 86 using the aggressive embedding dropout operation 84. The malware detection application 44 directly modifies the embedding 50 as it no longer needs the full-sized sixty-four (64) values. For simplicity, FIG. 2 illustrates the slashed embeddings 80 having only two (2) values 88. The aggressive embedding dropout operation 84, in other words, dimensionally reduced the 64-valued vectors to two-valued vectors 88. By generating the slashed embeddings 80, having only a subset of the total 64 values, the malware detection service 34 requires much less computations, fewer nodes (aka neurons) in the artificial neural network 32, much less hardware/network resources, and much less electrical power. Indeed, as this disclosure will later explain, experimental testing and evaluation have shown that the feature importance operation 82 and the aggressive embedding dropout operation 84 still yield a very reliable malware detection service 34, while greatly improving computer functioning.

As FIG. 3 illustrates, the architecture of the malware detection service 34 may be changed. Once the malware detection application 44 identifies the dropout hyperparameter 86, the malware detection application 44 may custom configure and streamline the artificial neural network 32. The malware detection application 44, for example, may run the embedding generation step together with the aggressive dropout operation 84. The dropout hyperparameter 86 used in the aggressive dropout operation 84 can dynamically instruct the generation step to exclude certain values from the embedding vectors 54. Moreover, the same dropout hyperparameter 86 can be even used to change the artificial neural network's layout by dropping the unnecessary output nodes to match the needed subset of embedding values. This reduces the number of computations needed in order to compute the embeddings 50, a step which is intensively used especially because the malware detection application 44 needs a substantial amount of sampled n-grams 60 in order to correctly assess a client's request. Thus, this optimization approach conserves the aforementioned resources.

FIGS. 4-10 illustrate prototype examples of the malware detection service 34. The feature importance operation 82 and the aggressive embedding dropout operation 84 were experimentally conducted and the newly obtained embedding-based classifier was compared to baseline performance. The baseline performance was determined by using all the sixty-four (64) embedding values in training an embedding-based classifier. The example provided shows an embedding-based classifier which was trained to detect malicious coding in MICROSOFT® Office documents. A corpus of the MICROSOFT® Office documents contained samples tagged by experts with domain knowledge as being clean and malicious. The artificial neural network 32 generated the sixty-four (64) valued embedding for each sampled byte n-gram 60. These embeddings were afterwards processed and used in training the embedding-based classifier (i.e. XGBoost model).

Simplifications were then tested. The malware detection application 44 used the same embeddings 50, each having 64 values, to input them to the feature importance operation 82. While many dimensionality reduction schemes are known and may be implemented, the experimental evaluations used the known Principal Component Analysis (or PCA) 106 to identify the dropout hyperparameter 86. The PCA 106 is deterministic (meaning the PCA 106 returns the same results when run over the same input corpus) and unsupervised (meaning the PCA 106 does not require labels over the n-gram embeddings 50). The below Table 1 illustrates the total number of MICROSOFT® Office examples used for this experiment, as well as their distribution per class of interest (e.g., clean vs dirty/malicious).

TABLE 1

| sample distribution of clean and dirty MICROSOFT ® Office documents | | |
|---|---|---|
| Clean | Dirty | Total |
| 33.022 | 25.854 | 58.876 |

In order to get feature importance with PCA 106, duplicates were removed using hash-based removal over the embedding vector 54 (excluding the label). Moreover, the prototype examples were conceptually proven using publicly-available resources, such as the IncrementalPCA toolkit available from the https://www.scikit-learn.org project. Once duplicates were removed, the 868,527,037 distinctive embeddings 50 were incrementally added using the IncrementalPCA toolkit. Such a large dataset, using a regular PCA tool, would require large hardware resources. Instead, prototype testing used the IncrementalPCA toolkit, which allows large datasets to be added using batch feeds.

Figure 6:
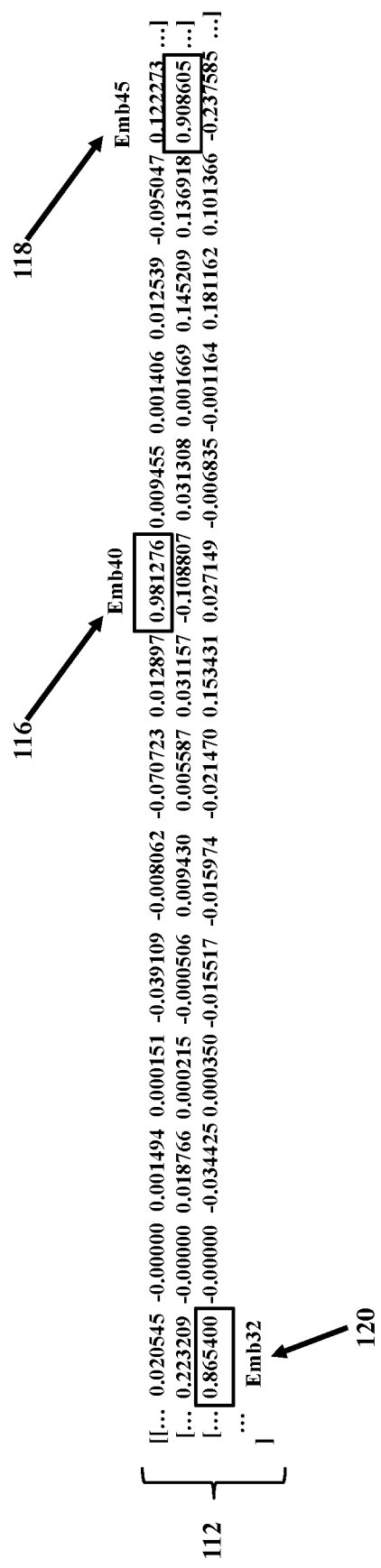

FIGS. 5-6 illustrate ranking of the embedding indices (placements). The feature importance operation 82 used the Principal Component Analysis as a feature selection tool or scheme. After fitting all the embeddings 50 into the IncrementalPCA toolkit, FIG. 5 illustrates a tabular arrangement of the first or best eleven (11) embeddings 50 that best describe the input data. The feature importance operation 82 thus applied the PCA 106 to identify and rank the embeddings 50 being more descriptive or important in determining malicious content. FIG. 5, in particular, illustrates the first or best eleven (11) principal components 110, ranked according to their corresponding eigenvector magnitudes 112, and their corresponding embedding index 114. The principal components 110 identified by the PCA 106 are known to be eigenvectors, and the contribution of each principal component 110 may be ranked based on the absolute value of the magnitude 112 of its corresponding eigenvalue. FIG. 6 illustrates a tabular arrangement of the eigenvector magnitudes 112. As both FIGS. 5 and 6 show, the most descriptive embeddings 50 (corresponding to the eigenvectors with the highest absolute values) are found at index 40 (illustrated as reference numeral 116), followed by the embedding at index 45 (illustrated as reference numeral 118), next ranked by index 32 (illustrated as reference numeral 120), and so on. These experimental results, of course, are particular to the use-case (e.g., the corpus 100 of the MICROSOFT® Office documents). For other problem setups (e.g., a different dataset composition, different file types 102, different model 58, other scope, etc.), the ranked descriptive embeddings index may be different.

Figure 8:
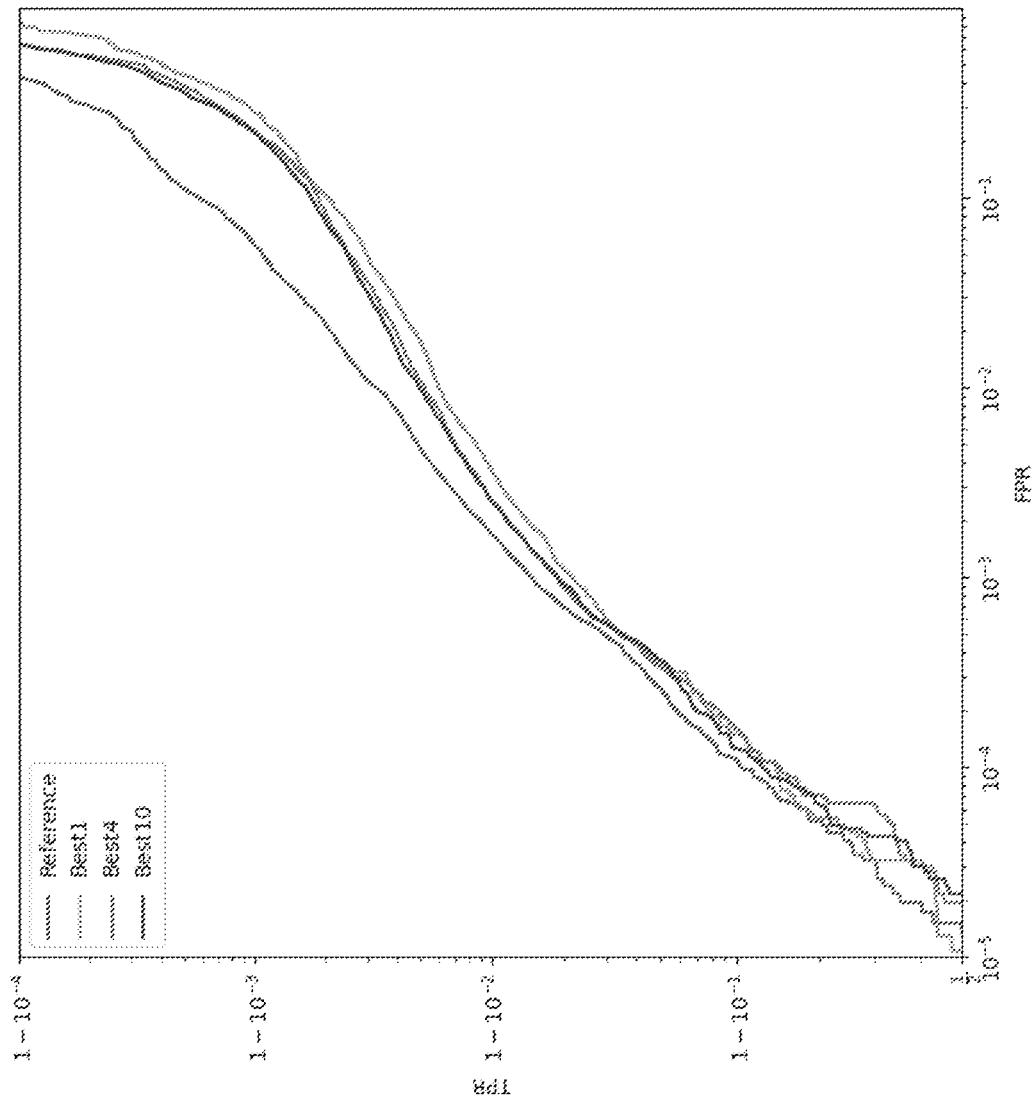

FIGS. 7-8 illustrate detection comparisons. The corpus of computer files 38 (e.g., the MICROSOFT® Office documents explained with reference to FIGS. 4-6) filled byte buffers of clean and malicious types 102 of files having known or identifiable file extensions 104 (e.g., .docx, .pptx, .xlsx, and many others). The corpus was randomly split using the 80/20 rule for training and testing (80% of the samples were in the training set and the rest of 20% in the testing set). The training data was split once again using the 80/20 rule and the 20% was kept as a validation set. The same sets were used for all model trainings to ensure a fair evaluation on the models' detection capabilities. As this disclosure above explained, the baseline measurements trained the machine learning model using all the 64-valued embeddings 50. Experiments were then performed using the feature importance operation 82 and the aggressive embedding dropout operation 84 (illustrated in FIG. 4). The aggressive embedding dropout operation 84 was applied to ignore or exclude most, or nearly all, lower-ranked embeddings 50. For example, experiments were performed by training three (3) machine learning models using only highly-ranked embeddings 50 at the following indices:

1) Best Embedding Model: 40;
2) Best 4 Embeddings Model: 1, 32, 40 and 45; and
3) Best 10 Embeddings Model: 1, 17, 31, 32, 40, 43, 44, 45, 52 and 61.

FIG. 7 thus illustrates a table of different detection capabilities, measured as the Area Under the Curve (or AUC) values 122, partialAUC values 124, and logloss values 126. The table also lists the baseline reference values 128 that used all the 64-valued embeddings 50. FIG. 7 shows that the experimental machine learning models (implemented using the feature importance operation 82 and the aggressive embedding dropout operation 84) retain over 99.93% of the detection capabilities in AUC values 122 and 99.5% of the detection capabilities in PartialAUC values 124, while adding only 0.00787 to an already very low logloss metric.

FIG. 8 also illustrates detection capabilities. FIG. 8 illustrates a plot or graph of a receiver operating characteristic (ROC) curve analysis comparing the baseline accuracy to the experiments implementing the feature importance operation 82 and the aggressive embedding dropout operation 84 (illustrated in FIGS. 2-4). As FIG. 8 again shows, the machine learning models applying the feature importance operation 82 and the aggressive embedding dropout operation 84 retain high detection capabilities (i.e., the experimental curves closely match the baseline curve), even when using less embeddings 50. Furthermore, in this use case, adding additional embeddings 50 (or features 64) to the detection pipeline does not significantly improve the model to justify using more than a single embedding 50 in the final product.

FIG. 9 illustrates benchmarking. In order to better understand the impact of the feature importance operation 82 and the aggressive embedding dropout operation 84 (illustrated in FIGS. 2-4), a performance analysis was performed using 100,000 samples from the corpus of the MICROSOFT® Office documents. The results were computed using an internal application for tracing function call execution times of a given binary. FIG. 9 is a table having entries listing the performance analysis as percentage changes in a time of malware detection. The performance comparison shows a large 20%-30% reduction in runtime for the feature-extraction engine (which includes the embedding processing and other feature extraction techniques for MICROSOFT® Office files) using the feature importance operation 82 and the aggressive embedding dropout operation 84, as compared to the baseline runs. Because the performance analysis was executed using a personal AMAZON® instance, the overall optimization percentage might reflect a lower number than is experienced in a controlled environment as other running processes might have affected the runtime.

FIG. 10 illustrates further optimizations. Because the artificial neural network 32 (illustrated in FIGS. 1-4) has multiple neurons in the final output layer, further optimizations in the pipeline can achieve an even faster response time. FIG. 10, for example, is a table having entries listing runtime comparisons for different malware detection pipeline architectures. FIG. 10 illustrates the embedding processing step (embedding-based Feature Extractor) runtimes according to the optimization approaches. By removing unnecessary neurons from the final layer, the number of computations inside the embedder architecture is reduced. As FIG. 10 illustrates, runtimes were reduced by an additional 68.645% (in nanoseconds) over the embedding processing step implementing the aggressive embedding dropout operation directly in the embedder layout. Again, this runtime performance test was locally run, meaning that the application might perform better once deployed in a controlled environment. Regardless, while the feature importance operation 82 and the aggressive embedding dropout operation 84 yield significant runtime reductions (as explained with reference to FIG. 9), this further optimization (e.g., reducing the number of computations inside the embedder architecture by removing unnecessary neurons from the final layer 70) shows a custom malware detection pipeline would be the best solution for resource sensitive environments (such as IoT devices).

Figure 11:
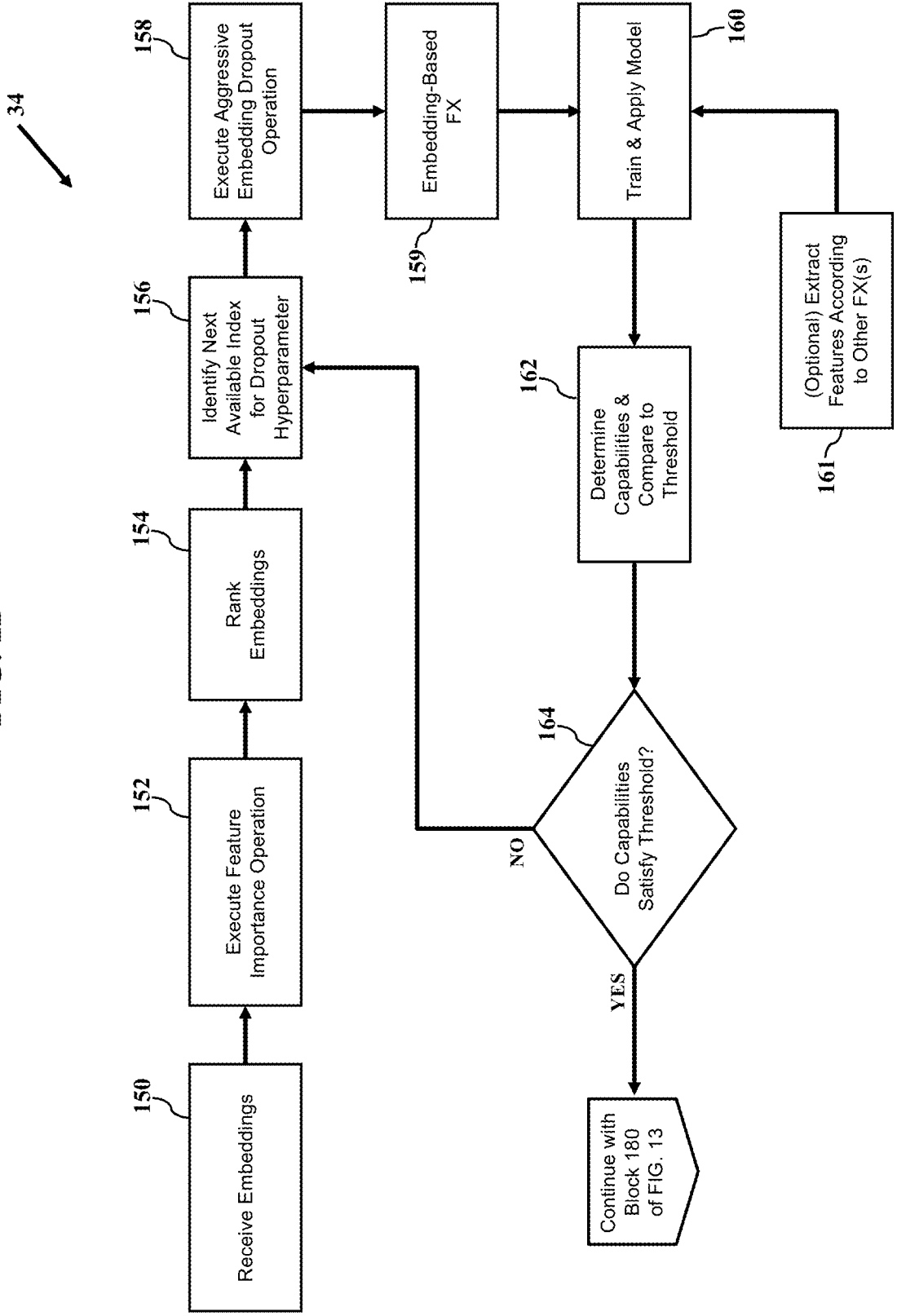
FIGS. 11-12 are block diagrams illustrating examples of improved computer functioning when detecting malware.
Figure 12:
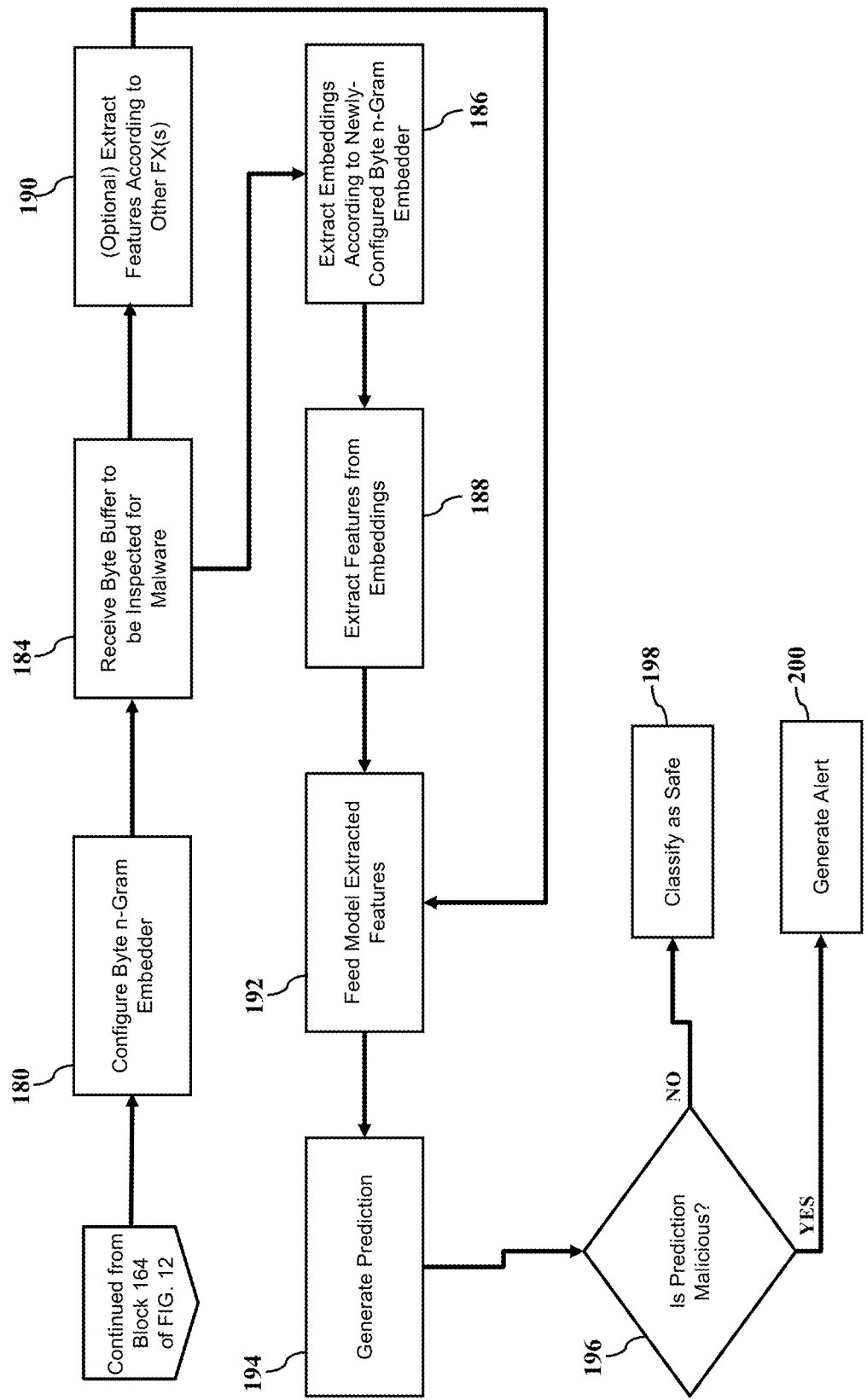

FIGS. 11-12 are block diagrams illustrating the simplified and improved malware detection service 34. The full set of 64-valued embeddings 50 is received (Block 150) and the feature importance operation 82 is executed (Block 152) to rank all 64 embedding placements from highest to lowest importance (Block 154). The single highest or first ranked, most important/descriptive embedding index is identified (Block 156) and added to the dropout hyperparameter list. The aggressive embedding dropout operation 84 is performed to ignore lower-ranked embeddings (Block 158). The embedding-based feature extractor (FX) is executed (Block 159) to extract the byte 4-grams. If the reference model was trained using additional Feature Extractors (FXs), then the application will execute them in order to retrieve the features and add them to the embedding-based FVs (Block 161). The machine learning model is trained according to the single highest ranked, or most important/descriptive, embedding 50 using the corpus (Block 160). The model's malware detection capabilities are determined and compared to a detection threshold (Block 162). The detection threshold is a predetermined maximum difference between the baseline malware detection capabilities (using all the 64-valued embeddings 50) and the revised malware detection capabilities using only the most important/descriptive embedding 50 found in the dropout hyperparameter 86. If the malware detection capabilities satisfy (e.g., equals or exceeds) the detection threshold (Block 164), then the machine learning model 58 is approved or authorized for the production malware detection pipeline and the examples continue with Block 180 of FIG. 12.

Refinement or tuning may be required. If the malware detection capabilities fail to satisfy (e.g., less than) the detection threshold (Block 164), then the aggressive embedding dropout operation 84 increments to select a second or subsequently-ranked embedding 50 (e.g., an additional embedding index added to the dropout hyperparameter list 86) (Block 156). The malware detection service 34 then follows the same steps as previously: running the aggressive dropout (Block 158), executing the embedding-based feature extractor (Block 159), training a new model using the new embeddings (Block 160), and then evaluating its detection capabilities (Block 162). The malware detection service 34 continues successively ignoring lower-ranked embeddings until the detection capabilities satisfy the detection threshold (Block 164). The examples thus show that some minimum number of the embeddings 50 will cause the machine learning model (e.g., the byte n-gram embedding model 58 illustrated in FIGS. 1-5) to have acceptable detection capabilities without excessively consuming hardware, network, and energy resources. The byte n-gram embedding model 58 may thus be tuned or configured according to tradeoffs between different malware detection capabilities and different numbers of the embeddings 50. Once the embedder and featurizer are configured and the model/classifier is trained according to the aggressive embedding dropout operation 84, the embedding-based classifier may be deployed in the production malware detection pipeline.

The examples continue with FIG. 12. Because the malware detection capabilities satisfied the threshold (see Block 164 of FIG. 11), the aggressive embedding dropout operation 84 and the machine learning model 58 (e.g., the embedding-based classifier/model) are approved to be released for the production malware detection pipeline. The byte n-gram embedder is configured (Block 180) to extract the embeddings 50, according to the dropout hyperparameter previously tuned (list of embedding indices). Sample data (such as from the byte buffer) is received (Block 184) as an input and undergoes sampling to extract the byte n-grams necessary for the embedder (Block 186). The resulting embeddings are then sent to the embedding featurizer (Block 188). Additional feature extractors may be optionally added and used in the detection pipeline (Block 190). The embedding-based feature(s) and other optional features are fed as inputs to the machine learning model (Block 192) and predictively classified (Block 194). The predictive classification is compared to a rule or threshold value (Block 196) and classified as either clean (Block 198) or malicious. When the malicious classification is determined, the malicious classification may be used to generate an alert notification (Block 200) and to implement escalation procedures. While FIGS. 11-12 are explained using a binary data problem, the pipeline architecture may be used in other multiclass or multi-label problems.

A threat notification scheme may be used. When evidence of the malware 20 is detected, the malware detection service 34 sends back to the client the application's response containing the model's prediction. On the client's side, this response, if malicious, can be used to alert, halt processes and quarantine files.

Additionally, the service can implement an external alert notification such as SMS texts, emails or webpage posting. The malware detection service 34 can provide additional information regarding the prediction provided such as the file type 102, the buffer's hash, the probability of the provided buffer being malicious, so on.

The examples include local or end-point malware coverage. The infrastructure can be copied to run directly on the machine. The infrastructure runs as a background process which can analyze the targeted data. The infrastructure uses the embedder, feature extractors and model to decide whether a target data is malicious or not and act accordingly. The infrastructure is deployed on the local device together with all the necessary components in order to fulfill its job.

Figure 13:
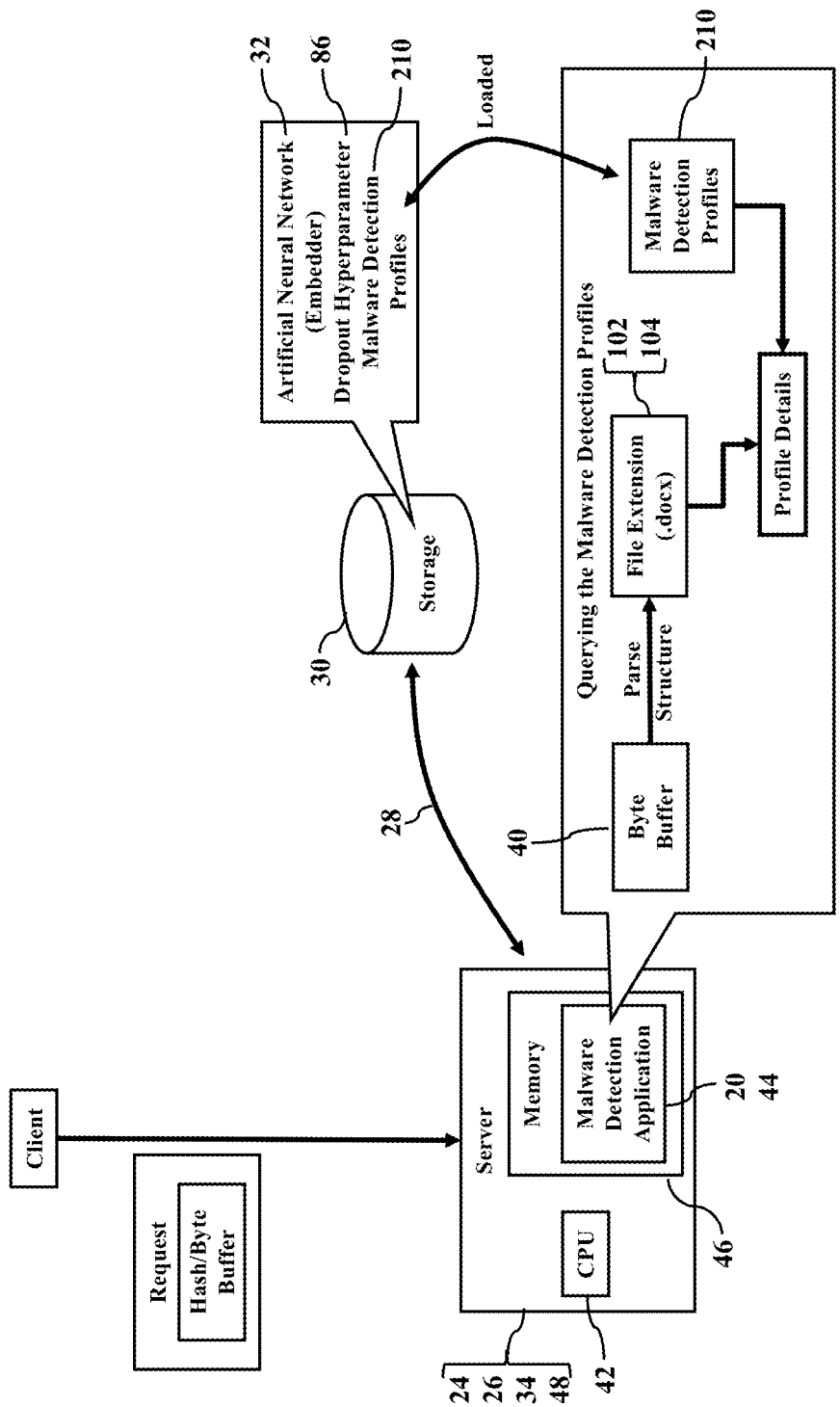
FIGS. 13-15 illustrate examples of a dynamically-configurable malware detection service.
Figure 14:
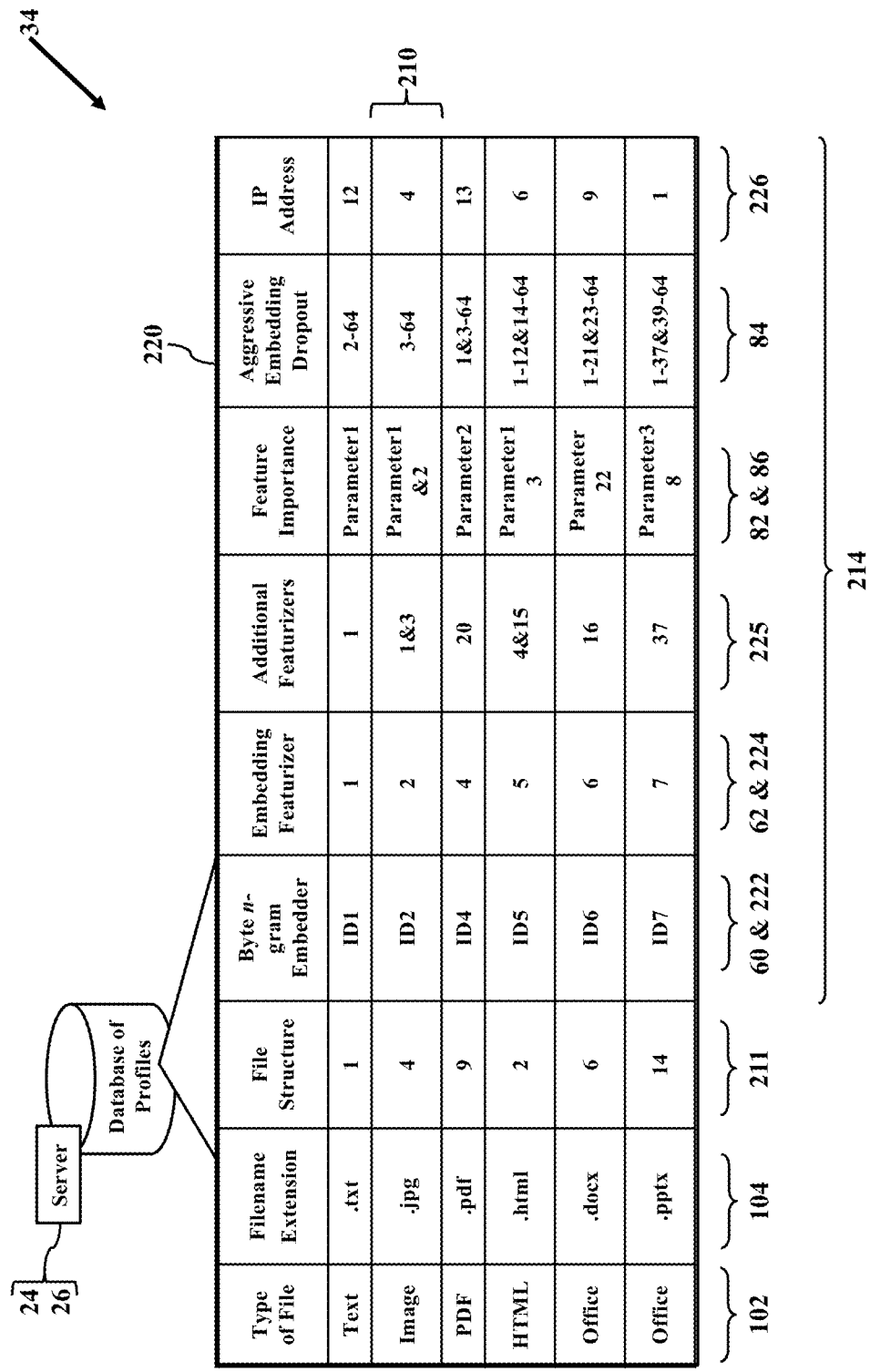
Figure 15:
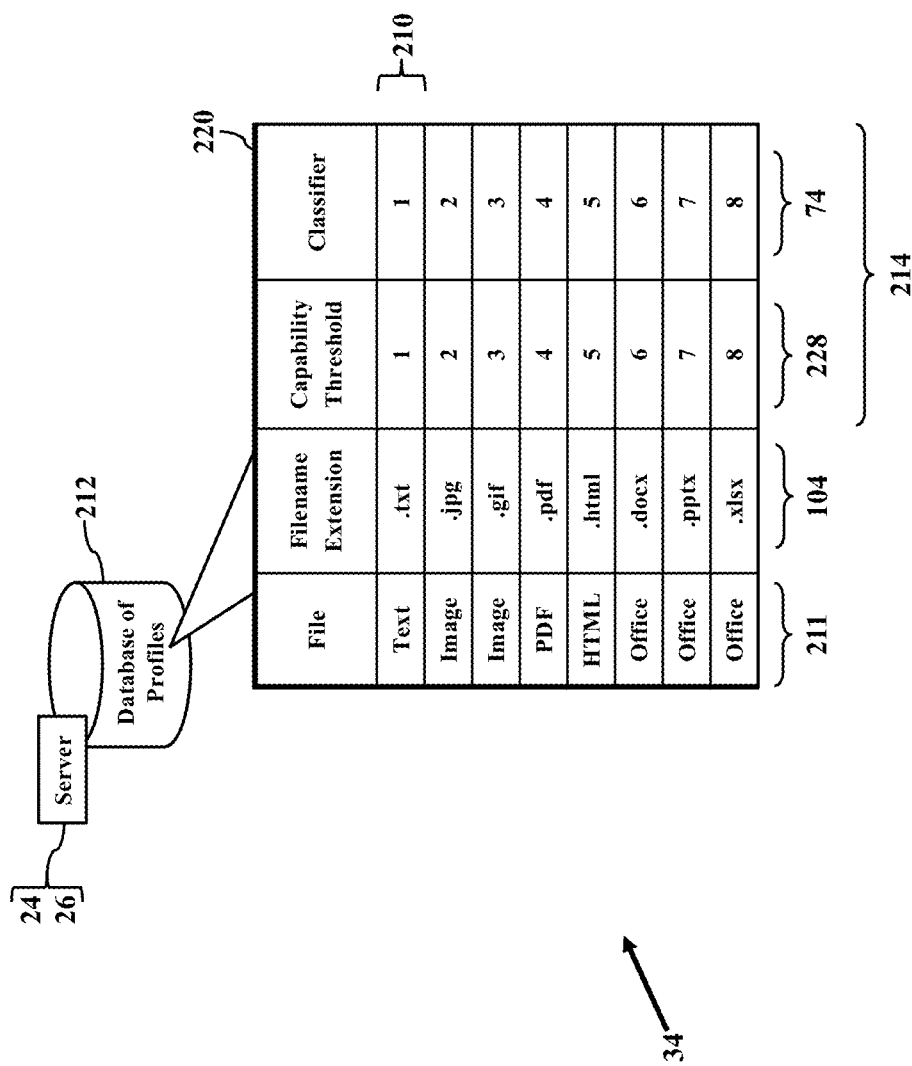

FIGS. 13-15 illustrate examples of a dynamically-configurable malware detection service 34. This disclosure above explains how a substantially reduced number of embeddings 50 may have little or no practical effect on malware detection capabilities. The feature importance operation 82 and the aggressive embedding dropout operation 84, in other words, substantially reduce runtimes and computing/networking resources with generally satisfactory or equal malware detection capabilities. While the feature importance operation 82 and the aggressive embedding dropout operation 84 were experimentally proven using the corpus of samples of MICROSOFT® Office documents, the feature importance operation 82 and the aggressive embedding dropout operation 84 may be applied to other types 102 of computer file 38. Indeed, the inventors envision training different types of embedding-based models 58, depending on the type 102 of the computer file 38 being analyzed for malware 20. The malware detection service 34, in other words, may dynamically change according to the malware detection profiles 210, based on the file structure 211 of the computer file 38. Indeed, merely checking the file extension 104 may not be adequate to determine whether the file 38 is, for example, a MICROSOFT® Office document or not. Attackers can change the file extension 104 to look like a .pdf file. In order, then, to correctly determine the file type 102, one must look at the file's structure 211. So, when the malware detection service 34 receives any computer file 38 or data 40, the malware detection service 34 may query for and identify the corresponding malware detection profile 210. Indeed, the malware detection service 34 may even maintain electronic records indicating which machine learning model 58 and/or which aggressive embedding dropout operation 84 is specified for the particular data type 102 and/or file structure 211.

FIG. 13-15 illustrate the malware detection profiles 210. For simplicity, the examples show these malware detection profiles 210 saved into a configuration file having all the necessary information in a tabular structure. The malware detection profiles 210 are saved in a remote storage which can be accessed by the malware detection service 34 and loaded inside the malware detection application 44 for future queries. Once a byte buffer or a pinpointing hash value is received from the client, the malware detection application 44 begins by querying the malware detection profiles 210 for the adequate profile details 214. This is done by firstly parsing the buffer's structure in order to determine its file type extension 104 (or type 102) and then matching the extension 104 (type 102) to the existing profile details 214. Once a match is found, the malware detection application 44 has all the necessary information in order to continue with processing the input (i.e. n-gram embedder ID 222, additional featurizers IDs 225, classifier IDs 74, dropout hyperparameters IDs 84, etc.).

As FIG. 14 illustrates, the malware detection application 44 may consult the malware detection profiles 210. Once the malware detection application 44 identifies the file extension 104 (type 102), the malware detection application 44 may then determine the corresponding malware detection profile 210. While the malware detection profiles 210 may have other logical structures, a tabular format is perhaps easiest to understand. FIG. 14 thus illustrates the malware detection profiles 210 as a table 220 of rows and columns that map the file extension 104 (type 102) to its corresponding malware detection profile 210. The malware detection service 34 queries the database 212 according to the file extension 104 (type 102) and retrieves the configuration stored in the corresponding malware detection profile 210. For simplicity, FIG. 14 only illustrates a small set of generalized profiles, but the dataset can contain a larger amount of such malware detection profiles 210. With all the information retrieved from querying the malware detection profiles 210, the malware detection application 44 may now generate the reduced embedding vector 54 using the assigned embedder 222. The embedder 222 uses the predefined aggressive embedding dropout hyperparameter 84 computed from the ranking resulted from the Feature Importance step. With the embeddings 50 generated, the malware detection application 44 now can call the assigned Embedding Featurizer 224 and other optional Feature Extractors 225 to create the necessary FV(s) for the classifier 74. Entries may further specify network IP addresses 226 identifying which computer nodes perform the functions or services representing the byte n-gram embedder 222, the byte n-gram featurizer 224, the feature importance operation 82, the aggressive embedding dropout operation 84, and the embedding-based classifier 74.

FIG. 15 illustrates still more profile-specific entries. Once the malware detection application 44 identifies the file extension 104 (type 102), the malware detection profiles 210 may have entries that map the corresponding malware detection capability threshold 228 (as this disclosure above explains with reference to FIGS. 4-12). Each malware detection profile 210, in other words, may be preconfigured to identify the configuration parameters 214, the network locations, and the network services that provide the malware detection service 34, according to the file extension 104 (type 102).

As previously mentioned in this application, the malware detection service 34 can be run locally on the device it was installed. Here, the device has all the necessary components in order to run the complete analysis over the targeted data 40 without any need to interact with external resources. This means that the malware detection service 34 has the malware detection application 44 inside the device with all of its components (malware detection profiles 210, n-gram embedders 222, embedding featurizers 224, classifiers, dropout hyperparameters 86, so on) and follows the same steps as provided in FIGS. 10-11.

Figure 16:
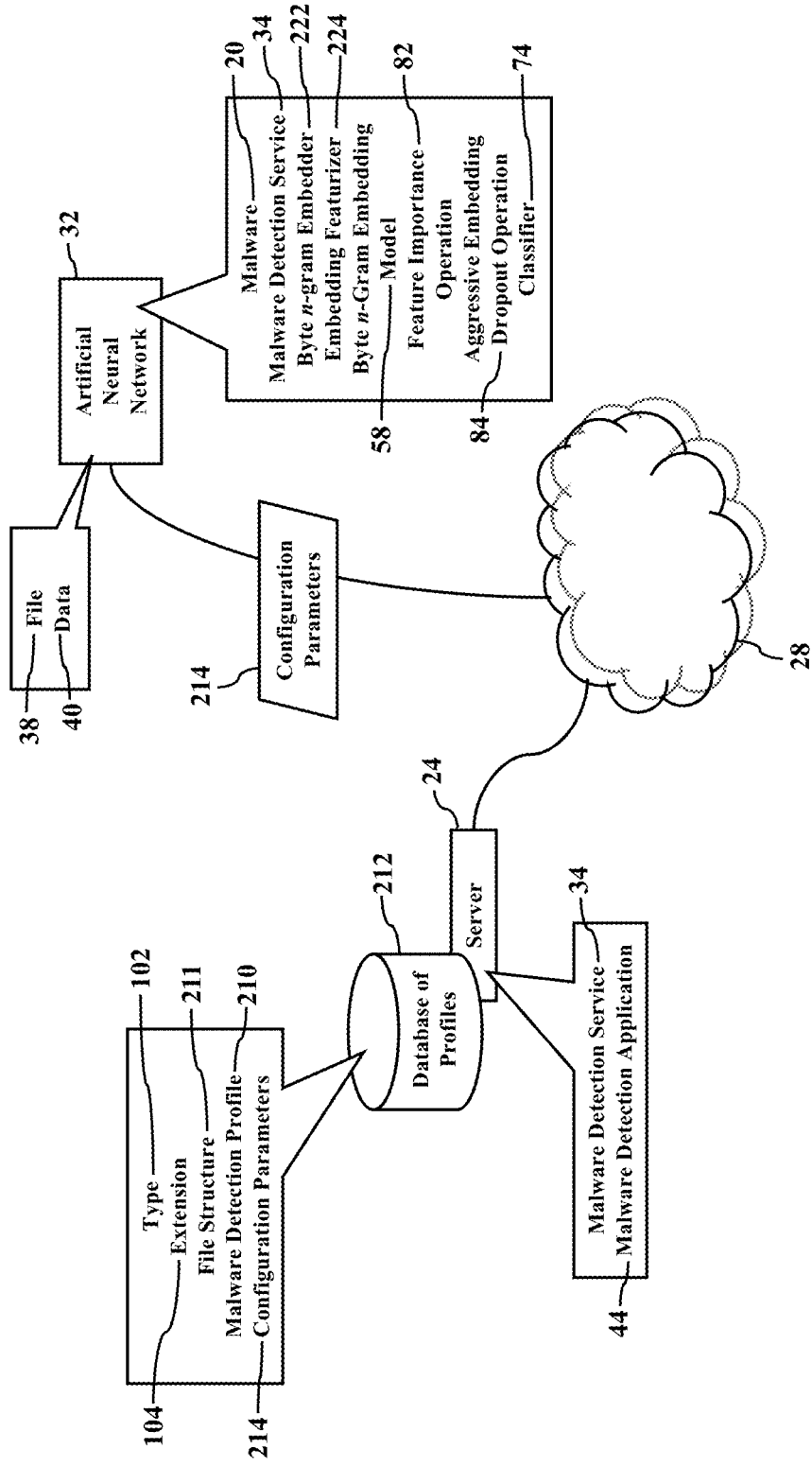
FIG. 16 illustrates examples of remote configuration of the malware detection service.

FIG. 16 illustrates examples of remote configuration of the malware detection service 34. Although the malware detection service 34 can be directly installed on any device, the remote analysis is always preferred over the local one. In remote analysis illustrated by FIG. 16, the client device (such as the computer system 24 or the lot device 230) sends the targeted data 40 directly to the clouded malware detection service 34 where it uses the computation resources provided by the cloud computing environment 22 it has been deployed on. The reason why this is preferred to the local analysis is because most of the times the client devices 24/230 have lower computational resources compared to the cloud environments (low response time vs fast response time). Additionally, by analyzing the data 40 remotely, the device 24/230 is free to use its resources for other purposes. This strategy is especially useful in the case of the IoT devices 230. A thing to keep in mind is that, although this strategy seems to solve the issue with the lack of computational resources in IoTs, it can be easily tampered with by just disconnecting the device from the internet, hence the need to optimize the malware detection service 34 to be less resource intensive in case of the need to run a local analysis.

Figure 17:
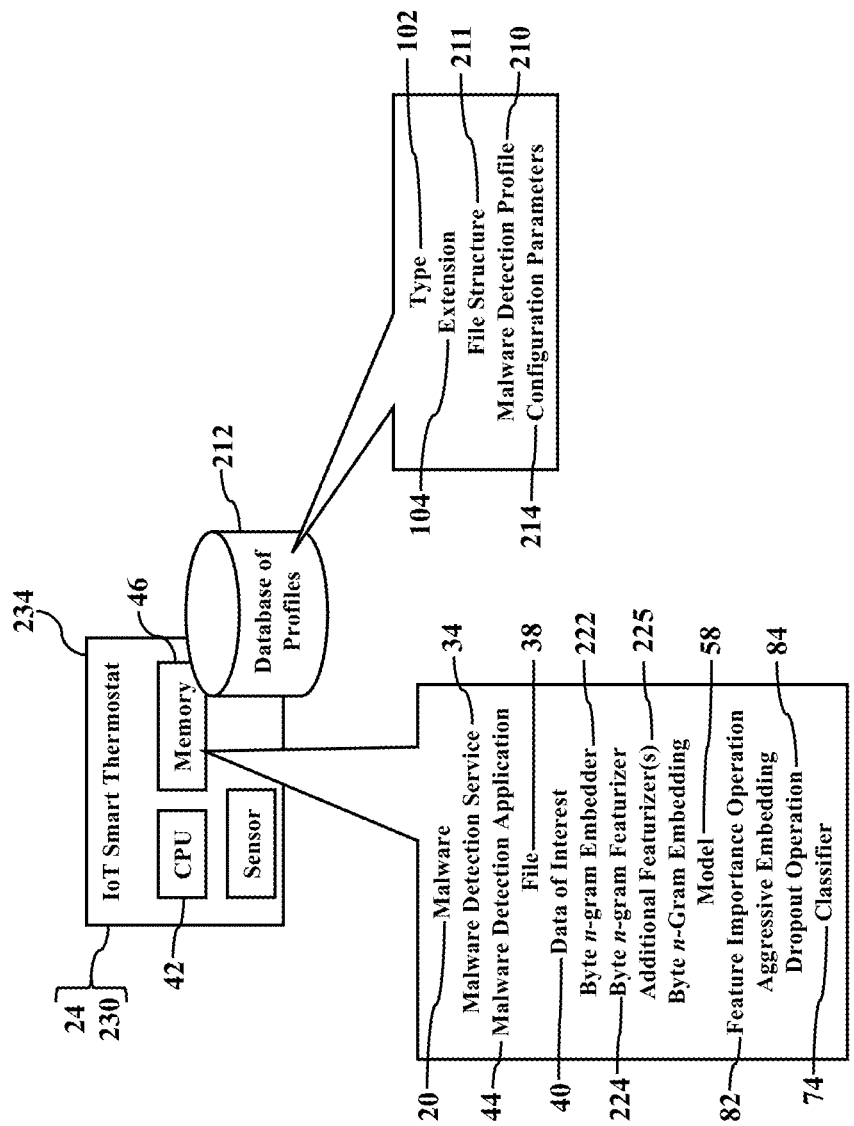
FIG. 17 illustrates componentry examples of the malware detection service installed to an IoT device.

FIG. 17 illustrates componentry examples of the malware detection service 34 installed directly on the IoT device 230. Although FIG. 17 shows a Smart Thermostat 234, the same structure can be applied to any other smart devices such as smart watches, smart locks, rain sensors and so on. As mentioned previously in the local application of this malware detection service 34, the IoT device 230 gets through the installation all the necessary items to successfully run the malware detection application 44 and get a prediction on a targeted file 38. An important observation to make is that the malware detection application 44 installed on the IoT device 230 no longer needs the feature importance operation 82 as it represents the deployment environment this disclosure previously talked about. This means that the IoT device 230 receives a production-ready malware detection application 44 with all of its components approved and already researched. As the feature importance operation 82 is used only to determine the best set of embedding indices and this step has already resulted in a dropout hyperparameter 86, the IoT device 230 needs only to match the target file 38 to the corresponding the malware detection profile 210 in order to get an assessment and, if necessary, an alert or prevention method.

The remote analysis in IoT devices 230 follows the structure presented in FIG. 16. The malware detection application 44 installed on the IoT device 230 can send a request to the clouded malware detection service 34 instead of locally running the detection. Again, this is possible only when the IoT device 230 is connect to the internet. If the clouded malware detection service 34 can be reached, then the malware detection application 44 sends a request in which the file buffer or the file hash is present. The clouded malware detection service 34 then uses the buffer, if directly provided or downloads the buffer corresponding to the sent hash, to go through all necessary operations in order to generate a prediction. Based on the receive response, the malware detection application 44 installed on the IoT device 230 can generate an audible and/or visual alert that warns the client. It can also stop and quarantine the file.

A production-ready malware detection application 44 follows the same steps as shown in FIG. 12. Once a targeted file or buffer is sent to the malware detection service 34 (locally or remotely), the malware detection application 44 configures the byte n-gram embedder 60 & 222 according to the file extension 104 (type 102). The embedder 222 then generates the adequate embeddings 50 according to the matched malware detection profile 210. These embeddings 50 then are processed and other features are added if necessary for the model. The trained classifier (model) generates a prediction based on the received FVs. The prediction can indicate the buffer is either clean or malicious, as presented in FIG. 12. Additionally, the malware detection application 44 can alert and call for prevention techniques over the malicious buffer.

The deployment environment may have any embodiment even if this disclosure discusses mainly the server and IoT device as possible environments. The malware detection service 34, however, may be easily adapted to mobile computing, wherein the environment may be a smartphone, a laptop computer, a tablet computer, or a smartwatch. The malware detection service 34 may also be easily adapted to other embodiments of smart devices, such as a television, an audio device, a remote control, and a recorder. The malware detection service 34 may also be easily adapted to still more smart appliances, such as washers, dryers, and refrigerators. Indeed, as cars, trucks, drones, delivery robots, and other vehicles grow in electronic usage and in processing power, the malware detection service 34 may be easily incorporated into any vehicular controller.

The above examples of the malware detection service 34 may be applied regardless of the communications network 28 and networking environment. The malware detection service 34 may be easily adapted to stationary or mobile devices having wide-area networking (e.g., 4G/LTE/5G cellular), wireless local area networking (WI-FI®), near field, and/or BLUETOOTH® capability. The malware detection service 34 may be applied to stationary or mobile devices utilizing any portion of the electromagnetic spectrum and any signaling standard (such as the IEEE 802 family of standards, GSM/CDMA/TDMA or any cellular standard, and/or the ISM band). The malware detection service 34, however, may be applied to any processor-controlled device operating in the radio-frequency domain and/or the Internet Protocol (IP) domain. The malware detection service 34 may be applied to any processor-controlled device utilizing a distributed computing network, such as the Internet (sometimes alternatively known as the "World Wide Web"), an intranet, a local-area network (LAN), and/or a wide-area network (WAN). The malware detection service 34 may be applied to any processor-controlled device utilizing power line technologies, in which signals are communicated via electrical wiring. Indeed, the many examples may be applied regardless of physical componentry, physical configuration, or communications standard(s).

The environment may utilize any processing component, configuration, or system. For example, the malware detection service 34 may be easily adapted to execute by any desktop, mobile, or server central processing unit 42 or chipset offered by INTEL®, ADVANCED MICRO DEVICES®, ARM®, APPLE®, TAIWAN SEMICONDUCTOR MANUFACTURING®, QUALCOMM®, or any other manufacturer. The computer 24 may even use multiple central processing units 42 or chipsets, which could include distributed processors or parallel processors in a single machine or multiple machines. The central processing unit 42 or chipset can be used in supporting a virtual processing environment. The central processing unit 42 or chipset could include a state machine or logic controller. When any of the central processing units 42 or chipsets execute instructions to perform "operations," this could include the central processing unit or chipset performing the operations directly and/or facilitating, directing, or cooperating with another device or component to perform the operations.

The communications network 28 may use packetized communications. When the computer 24, the server 36, or the IoT device 230 communicates via the communications network 28, information may be collected, sent, and retrieved. The information may be formatted or generated as packets of data according to a packet protocol (such as the Internet Protocol). The packets of data contain bytes of data describing the contents, or payload, of a message. A header of each packet of data may be read or inspected and contain routing information identifying an origination address and/or a destination address.

The communications network 28 may utilize any signaling standard. The cloud computing environment 22 may mostly use wired networks to interconnect the network members 30. However, the networks 22, 28, and 32 may utilize any communications device using the Global System for Mobile (GSM) communications signaling standard, the Time Division Multiple Access (TDMA) signaling standard, the Code Division Multiple Access (CDMA) signaling standard, the "dual-mode" GSM-ANSI Interoperability Team (GAIT) signaling standard, or any variant of the GSM/CDMA/TDMA signaling standard. The networks 22, 28, and 32 may also utilize other standards, such as the I.E.E.E. 802 family of standards, the Industrial, Scientific, and Medical band of the electromagnetic spectrum, BLUETOOTH®, low-power or near-field, and any other standard or value.

The malware detection service 34 may be physically embodied on or in a computer-readable storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for providing the malware detection service 34, as the above paragraphs explain.

The diagrams, schematics, illustrations, and tables represent conceptual views or processes illustrating examples of cloud services malware detection. The functions of the various elements shown in the figures may be provided through the use of dedicated hardware as well as hardware capable of executing instructions. The hardware, processes, methods, and/or operating systems described herein are for illustrative purposes and, thus, are not intended to be limited to any particular named manufacturer or service provider.

As used herein, the singular forms "a," "an," and "the" are intended to include the plural forms as well, unless expressly stated otherwise. It will be further understood that the terms "includes," "comprises," "including," and/or "comprising," when used in this Specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, and so on, may be used herein to describe various elements, these elements should not be limited by these terms. These terms are only used to distinguish one element from another. For example, a first computer or container could be termed a second computer or container and, similarly, a second device could be termed a first device without departing from the teachings of the disclosure.

The invention claimed is:

1. A method executed by a computer that detects a malware, comprising:
   receiving, by the computer, n-gram embeddings generated by a byte n-gram embedding model using byte n-grams;
   determining, by the computer, a descriptive n-gram embedding of the n-gram embeddings by ranking the n-gram embeddings according to a feature importance operation; and
   detecting, by the computer, the malware using a malware classifier trained using an aggressive embedding dropout operation that drops the n-gram embeddings according to a rank determined by the feature importance operation.

2. The method of claim 1, further comprising identifying the descriptive n-gram embedding by ranking positional indices associated with the n-gram embedding.

3. The method of claim 1, further comprising identifying the descriptive n-gram embedding by ranking values associated with the n-gram embeddings.

4. The method of claim 1, further comprising selecting an n-gram embedder according to the descriptive n-gram embedding.

5. The method of claim 1, further comprising selecting an n-gram feature extractor according to the descriptive n-gram embedding.

6. The method of claim 1, further comprising classifying a byte buffer.

7. The method of claim 1, further comprising detecting the malware associated with bits in a byte buffer.

8. The method of claim 1, wherein the determining of the descriptive n-gram embedding further comprises applying a principal components analysis to the n-gram embeddings.

9. At least one computer system that detects a malware, comprising:
- at least one central processing unit; and
- at least one memory device storing instructions that, when executed by the at least one central processing unit, perform operations, the operations comprising:
- receiving n-gram embeddings associated with an embedding vector generated by a byte n-gram embedding model using byte n-grams;
- determining a hyperparameter by ranking positional indices associated with the embedding vector according to a feature importance operation; and
- detecting the malware using a malware classifier trained using an aggressive embedding dropout operation that drops the n-gram embeddings according to the hyperparameter determined by the feature importance operation.

10. The at least one computer system of claim 9, wherein the operations further comprise identifying the descriptive n-gram embedding by the ranking of the positional indices.

11. The at least one computer system of claim 9, wherein the operations further comprise identifying the descriptive n-gram embedding by ignoring at least one of the positional indices.

12. The at least one computer system of claim 9, wherein the operations further comprise selecting an n-gram embedder according to the descriptive n-gram embedding.

13. The at least one computer system of claim 9, wherein the operations further comprise selecting an n-gram feature extractor according to the descriptive n-gram embedding.

14. The at least one computer system of claim 9, wherein the operations further comprise classifying a byte buffer.

15. The at least one computer system of claim 9, wherein the operations further comprise detecting the malware associated with bits in a byte buffer.

16. The at least one computer system of claim 9, wherein the operations further comprise applying a principal components analysis to the n-gram embeddings.

* * * * *